US010938077B2

(12) United States Patent
Day et al.

(10) Patent No.: US 10,938,077 B2
(45) Date of Patent: Mar. 2, 2021

(54) SYSTEM AND METHOD FOR IMPROVING A BATTERY CELL

(71) Applicant: The Boeing Company, Chicago, IL (US)

(72) Inventors: Gregory R. Day, Madison, AL (US); David E. Hall, Madison, AL (US); Dean S. Hallmark, Gurley, AL (US)

(73) Assignee: THE BOEING COMPANY, Chicago, IL (US)

( * ) Notice: Subject to any disclaimer, the term of this patent is extended or adjusted under 35 U.S.C. 154(b) by 150 days.

(21) Appl. No.: 16/242,802

(22) Filed: Jan. 8, 2019

(65) Prior Publication Data
US 2020/0220121 A1 Jul. 9, 2020

(51) Int. Cl.
*H01M 50/124* (2021.01)
*H01M 10/655* (2014.01)
*H01M 50/107* (2021.01)
*H01M 10/653* (2014.01)
*H01M 50/20* (2021.01)
*H01M 10/625* (2014.01)
*H01M 50/10* (2021.01)
*H01M 50/131* (2021.01)
*H01M 10/04* (2006.01)

(52) U.S. Cl.
CPC ....... *H01M 50/124* (2021.01); *H01M 10/655* (2015.04); *H01M 50/1245* (2021.01); *H01M 10/0422* (2013.01); *H01M 10/625* (2015.04); *H01M 10/653* (2015.04); *H01M 50/10* (2021.01); *H01M 50/107* (2021.01); *H01M 50/131* (2021.01); *H01M 50/20* (2021.01); Y02E 60/10 (2013.01)

(58) Field of Classification Search
CPC ............. H01M 2/0292; H01M 2/1077; H01M 2/026; H01M 2/0267; H01M 2/0285; H01M 2/022; H01M 2/0202; H01M 10/655; H01M 10/637; H01M 10/625; H01M 10/0422; H01M 2002/0297; H01M 150/124; H01M 150/655; H01M 150/131; H01M 150/20; H01M 150/116; H01M 150/107; H01M 150/10; Y02E 60/10
See application file for complete search history.

(56) References Cited

U.S. PATENT DOCUMENTS

2013/0108897 A1* 5/2013 Christian ............ H01M 10/613
429/50
2015/0118537 A1* 4/2015 Obasih ................ H01M 2/0267
429/120
2018/0090731 A1 3/2018 Knowles et al.

FOREIGN PATENT DOCUMENTS

CN 207572408 U 7/2018

OTHER PUBLICATIONS

Hussain et al., "Thermal management of lithium ion batteries using graphene coated nickel foam saturated with phase change materials", International Journal of Thermal Sciences, 2018.*

(Continued)

*Primary Examiner* — Matthew T Martin
(74) *Attorney, Agent, or Firm* — MH2 Technology Law Group LLP

(57) ABSTRACT

A system includes a battery cell and a graphene layer positioned on an outer surface of the battery cell. If the battery cell experiences a thermal runaway event, the graphene layer may help to direct any rupturing of the battery cell in a direction that may prevent the thermal runaway event from propagating to neighboring battery cells.

20 Claims, 5 Drawing Sheets

(56) References Cited

OTHER PUBLICATIONS

Mortazavi, "Molecular dynamis study on the thermal conductivity and mechanical properties of boron doped graphene", Solid State Communications, 2012.*
Balandin, "Thermal properties of graphene and nanostructured carbon materials," Nature Materials, Review Article published online Jul. 22, 2011, pp. 569-581.
Extended European Search Report dated May 29, 2020 in corresponding European Application No. 19212380.0, 11 pages.

* cited by examiner

SYSTEM AND METHOD FOR IMPROVING A BATTERY CELL

FIELD OF THE DISCLOSURE

The present disclosure is directed to systems and methods for improving battery cells. More particularly, the present disclosure is directed to systems and methods for improving lithium-ion battery cells during thermal runaway.

BACKGROUND

Modern battery assemblies can include one or more (e.g., hundreds of) cells that use a common form factor size, such as cylindrical, pouch, or prismatic. The cells may be or include lithium-ion (Li-ion) cells. Li-ion cells may have a (e.g., cylindrical) side wall that is only about 0.005 inches (i.e., 127 μm) thick to maximize the interior volume, thereby promoting higher energy capacity.

Li-ion cells are sensitive to high temperatures. At temperatures above, for example, about 90° C., the cells may progress into thermal runaway. Thermal runaway occurs in situations where an increase in temperature changes the conditions in a way that causes a further increase in temperature. It is a type of uncontrolled positive feedback. During thermal runaway, cell temperatures can reach or exceed about 800° C., and cell vent gas temperatures can reach or exceed about 1000° C.

During a thermal runaway event, the thin side wall of the battery cell may rupture, which may direct energy towards an adjacent battery cell, causing it to also enter thermal runaway. Thus, the problem may propagate to a plurality of battery cells.

SUMMARY

A system includes a battery cell and a graphene layer positioned on an outer surface of the battery cell.

In another implementation, the system includes a battery cell that is substantially cylindrical and includes a side wall, a first end wall, and a second end wall. The system also includes a graphene layer positioned on an outer surface of the side wall to increase a strength of the side wall, thereby reducing a likelihood that the side wall will rupture during a thermal runaway event. The graphene layer is not positioned on the outer surface of the first end wall, thereby increasing a likelihood that the first end wall will rupture during the thermal runaway event. The graphene layer has a thickness from about 0.4 micrometers (μm) to about 1.5 μm. The graphene layer has a thermal conductivity from about 1000 watts per meter-kelvin (W/m*K) to about 2500 W/m*K. The graphene layer has an electrical resistivity from about 0.5 E−6 ohms per meter (Ω/m) to about 10 E−6 Ω/m.

A method is also disclosed. The method includes applying a graphene layer on an outer surface of a side wall of a battery cell to increase a strength of the side wall, thereby reducing a likelihood that the side wall will rupture during a thermal runaway event. The graphene layer is not applied on an outer surface of a first end wall of the battery cell, thereby increasing a likelihood that the first end wall will rupture during the thermal runaway event.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
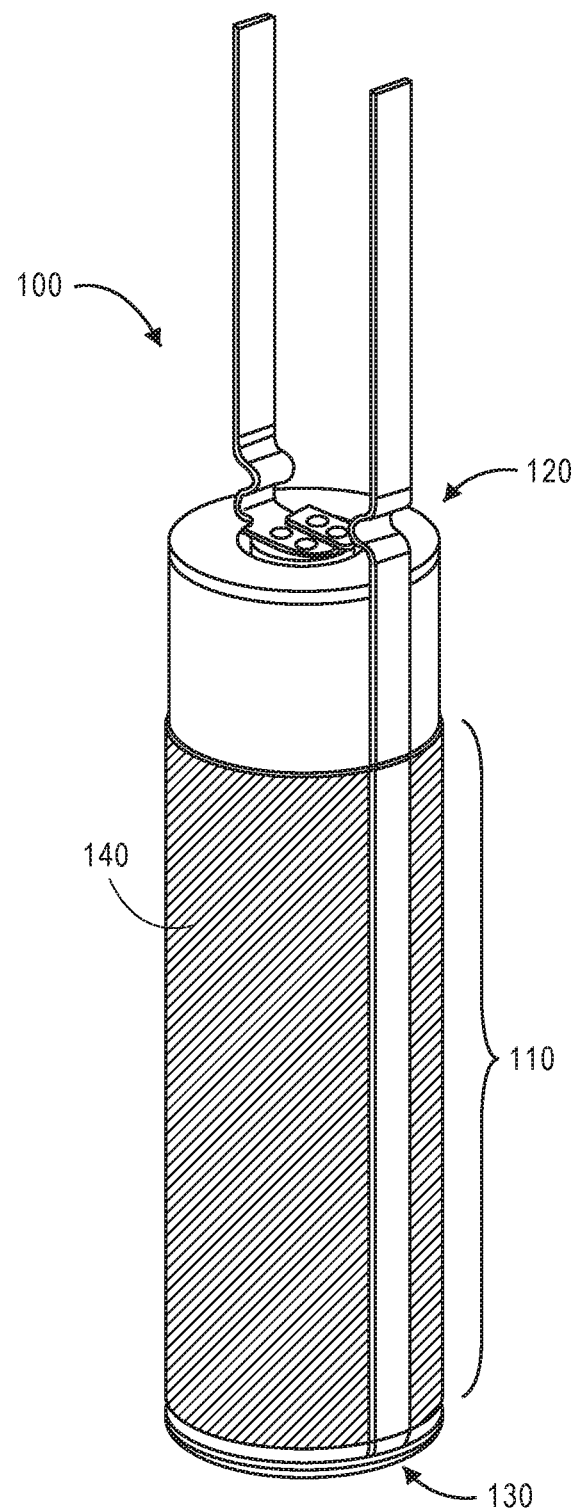
FIG. 1 illustrates a perspective view of a battery cell including a graphene layer applied thereto, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The system and method disclosed herein is configured to prevent propagation of a thermal runaway event from one battery cell to one or more neighboring battery cells. More particularly, the system and method may ensure that, if any single cell has a failure and enters thermal runaway, the effects of the thermal runaway (e.g., rupturing of the cell) is directed toward/through one or both axial ends of the cell, instead of through the (e.g., cylindrical) side wall of the cell. This may prevent propagation of a thermal runaway event from the battery cell to neighboring battery cell(s) that is/are positioned next to (i.e., side-by-side with) the battery cell.

FIG. 1 illustrates a perspective view of a battery cell 100 including a graphene layer 140 applied thereto, according to an implementation. The cell 100 may be or include a lithium-ion (Li-ion) cell. The cell 100 may be or include a 18650 cell, a 21700 cell, a D cell, the like. However, in other implementations, the cell 100 may be or include other/different types, sizes, and/or shapes.

As shown in FIG. 1, the battery 100 may be substantially cylindrical and include a (e.g., cylindrical) side wall 110, a first (e.g., upper) axial end wall 120, and a second (e.g., lower) axial end wall 130. The side wall 110 can have a (e.g., radial) thickness from about 100 micrometers (μm) to about 200 μm, about 100 μm to about 150 μm, or about 100μ to about 125 μm. The first end wall 120 can be or may include the positive terminal, and the second end wall 130 can be or may include the negative terminal, or vice versa.

The graphene layer 140 can be or may include a monocrystalline structure or a polycrystalline structure. The structure of the graphene layer 140 may depend at least partially upon the manner in which the graphene layer 140 is fabricated and/or applied, as discussed below. The monocrystalline structure may be more fracture-resistant than the polycrystalline structure. The polycrystalline structure may be less expensive than the monocrystalline structure to manufacture. The graphene layer 140 can be or may include a semi-metal with a small overlap between the valence and conduction bands, which gives the graphene layer 140 a semiconductor structure that allows a user to control and/or modify the thermal and/or electrical properties, as discussed below. The graphene layer 140 can be or may include an allotrope of carbon including one or more layers of carbon atoms arranged in a (e.g., hexagonal) lattice. The allotrope of carbon in a single layer provides a strong but very think graphene layer 140. Additional layers increase the strength.

The graphene layer 140 can be positioned at least partially on and/or around an outer surface of the battery cell 100. More particularly, the graphene layer 140 can be positioned on the outer surface of the side wall 110, the first end wall 120, the second end wall 130, or a combination thereof. In the implementation shown, the graphene layer 140 is positioned on and/or around the side wall 110, but not the first and second end walls 120, 130. This can increase a strength of the side wall 110. Accordingly, in the event that the battery cell 100 enters thermal runaway, the graphene layer 140 can reduce a likelihood that the side wall 110 will rupture, and direct/funnel the effects of the thermal runaway to the first and/or second end walls 120, 130, which may rupture to make way for the release of hot gases.

In another implementation, the graphene layer 140 can be positioned on and/or around the side wall 110 and the first end wall 120, but not the second end wall 130, such that, in the event that the battery cell 100 enters thermal runaway, the graphene layer 140 can reduce a likelihood that the side wall 110 and the first end wall 120 will rupture, and direct/funnel the effects of the thermal runaway to the second end wall 130, which may rupture to make way for the release of hot gases. In yet another implementation, the graphene layer 140 can be positioned on and/or around the side wall 110 and the second end wall 130, but not the first end wall 120, such that, in the event that the battery cell 100 enters thermal runaway, the graphene layer 140 can reduce a likelihood that the side wall 110 and the second end wall 130 will rupture, and direct/funnel the effects of the thermal runaway to the first end wall 120, which may rupture to make way for the release of hot gases.

In at least one implementation, the first end wall 120 and/or the second end wall 130 can include one or more vents to permit the release of at least a portion of the hot gases during lesser internal pressure events (e.g., caused by overheating during power delivery or charging as opposed to actually going into thermal runaway). However, in the event that the battery cell 100 enters thermal runaway, the vents may not be sufficient, and one or both of the end walls 120, 130 may rupture.

The graphene layer 140 can have a strength that is from about 10,000 pounds per square inch (lbs/in$^2$) to about 500,000 lbs/in$^2$, about 20,000 lbs/in$^2$ to about 300,000 lbs/in$^2$, or about 30,000 lbs/in$^2$ to about 100,000 lbs/in$^2$. Having a strength in the range(s) provided above may reduce the likelihood that graphene layer 140 (and/or the portion of the battery cell 100 covered by the graphene layer 140) will rupture during a thermal runaway event. In at least one implementation, the graphene layer 140 can be a single atom thick. In other implementations, the graphene layer 140 may have a (e.g., radial) thickness from about 0.4 µm to about 1.5 µm, about 0.6 µm (i.e., ~0.025 thousandths of an inch) to about 1.3 µm (i.e., 0.050 thousandths of an inch), or about 0.8 µm to about 1.1 µm. Such a graphene layer 140 may be about 200 times stronger than a steel layer and about 200 times thinner than a steel layer. Due to how thin the graphene layer 140 may be, the cell 100 with the graphene layer 140 may remain within industry standards for size and thus may be integrated into existing interstitial materials without modification of the battery cell 100. In addition, the strength of the graphene layer 140 may be less effected by heat (e.g., at runaway temperatures) than conventional steel. For example, steel may lose as much as 90% of its strength at runaway temperatures.

The graphene layer 140 can be a good thermal conductor. For example, the graphene layer 140 may have a thermal conductivity from about 1000 watts per meter-kelvin (W/m*K) to about 2500 W/m*K or from about 1500 W/m*K to about 2000 W/m*K. A thermal conductivity in this range allows the graphene layer 140 to help dissipate/bleed off the heat load during thermal runaway.

The graphene layer 140 may be doped to alter the characteristics of its thermal behavior. In one implementation, a plurality of doped graphene layers may be present. This doping can reduce the thermal conductivity from a baseline value. More particularly, this doping can minimize the thermal gradient across a core with multiple battery cells such that the electrical behavior and/or cell life remains substantially constant. In addition, this may reduce the effectiveness of a battery passive thermal control system such that the system may warm faster and/or operate more moderate temperatures in a cold environment.

The graphene layer 140 can also be a good electrical conductor. For example, the graphene layer 140 may have an electrical resistivity from about 0.5 E–6 ohms per meter (Ω/m) to about 10 E–6 Ω/m or from about 1 E–6 Ω/m to about 5E–6 Ω/m. An electrical conductivity in this range allows the battery cell 100 and/or the graphene layer 140 to be more easily integrated into a core circuit. For example, the graphene layer 140 can be coupled to and/or in contact with the positive terminal and/or the negative terminal of the battery cell 100 and have electrical current conducted therethrough (see, e.g., FIG. 2).

The graphene layer 140 may be doped to alter the characteristics of its electrical behavior. In one implementation, a plurality of doped graphene layers may be present. This doping may allow for switching the negative (can) terminal of the battery cell 100 into or out of the battery electrical architecture in a matter similar to a semiconductor. More particularly, this may allow for switching the battery cell 100 into or out of the matrix of a variety of scenarios (e.g., cell fault, core capacity balancing, change of S-P architecture, etc.).

The graphene layer 140 may be applied to the (e.g., side wall 110 of the) battery cell 100 in a variety of ways. In one implementation, the graphene layer 140 can be applied by wrapping a sheet of the graphene layer 140 around at least a portion (e.g., the side wall 110) of the battery cell 100. This may include wrapping a plurality of sheets of the graphene layer 140 sequentially. When the sheet(s) is/are wrapped, the graphene may have a monocrystalline structure, which as described above, may be more fracture-resistant than a polycrystalline structure.

In another implementation, the graphene layer 140 can be applied by growing the graphene in place. This may include chemical vapor deposition and/or physical vapor deposition; however, other methods may also be used to grow the graphene in place. When the graphene is grown, the graphene may have a polycrystalline structure, which as described above, can be less expensive to manufacture than a monocrystalline structure.

In yet another implementation, the graphene layer 140 can be formed into a (e.g., cylindrical) sleeve, which may be positioned/slid at least partially around and/or over the battery cell 100. This can provide for easy installation.

Figure 2:
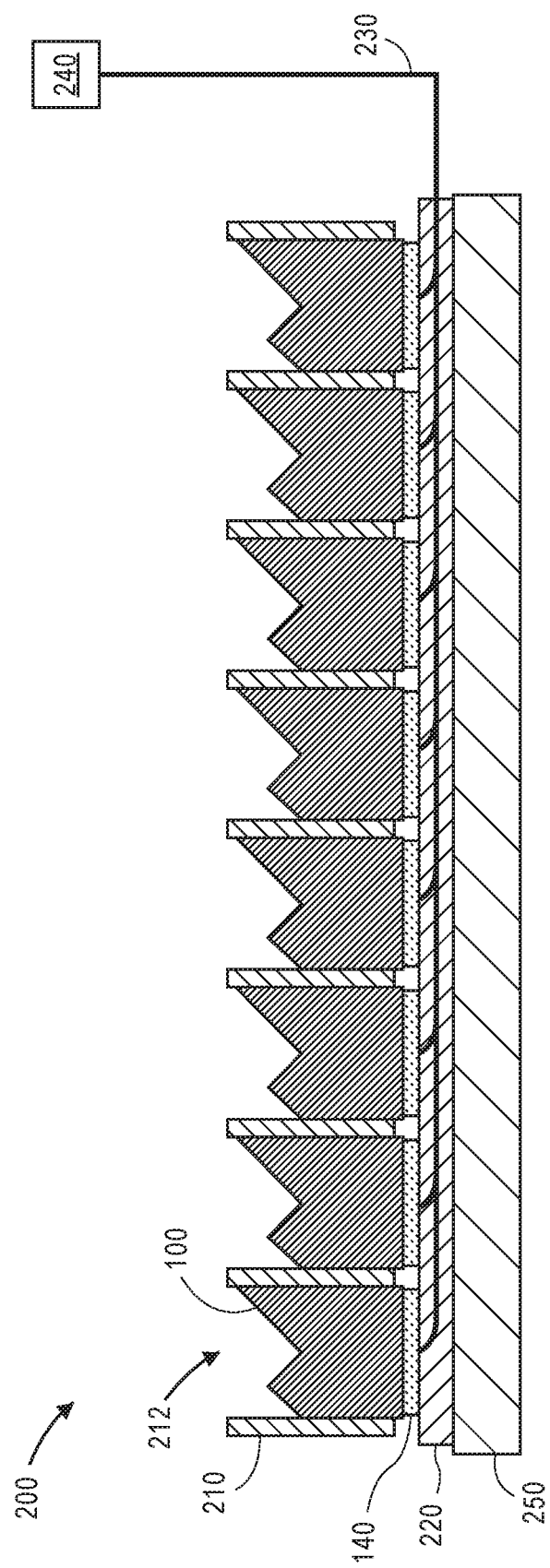
FIG. 2 illustrates a schematic view of a system for controlling a thermal conductivity of the graphene layer, according to an implementation.

FIG. 2 illustrates a schematic view of a system 200 for controlling a thermal conductivity of the graphene layer(s) 140, according to an implementation. The system 200 can include a cell support structure 210 defining a plurality of openings 212 in which the battery cell(s) 100 may be positioned. As shown, at least a portion of the side wall 110 of each battery cell 100 may be in contact with the cell support structure 210. In this manner, the cell support structure 210 can support the battery cell(s) in the desired location and orientation.

The system 200 can also include the graphene layer 140. In this implementation, the graphene layer 140 can be or may include a doped graphene thermal interface, which may include one or more layers. As shown, the graphene layer 140 may be in contact with the second (e.g., lower) end wall 130 of each battery cell 100. However, as will be appreciated, in other implementations, the graphene layer 140 can also or instead be in contact with the side wall 110, the first (e.g., upper) end wall 120, or both.

The system 200 may also include a thermal pad 220 that provides insulation. The thermal pad 220 may be positioned below/beneath the battery cells 100, the graphene layer(s) 140, and/or the cell support structure 210. As shown, the graphene layer(s) 140 may be positioned between the battery cells 100 and the thermal pad 220. The thermal pad 220 may have a conduit formed at least partially therethrough in which a wire 230 may be positioned. The wire 230 may extend from an electrical control interface 240 to the graphene layer(s) 140. The electrical control interface 240 may (e.g., electrically) modify one or more characteristics (e.g., thermal conductivity) of the graphene layer(s) 140 by modifying the voltage and/or current supplied thereto via the wire 230. For example, the thermal conductivity can be adjusted from a minimum value to a maximum value, which may be within the range(s) provided above. When not controlled by the electrical control interface 240 and the wire 230 (i.e., when no voltage or current is supplied), the graphene layer(s) 140 may default to the maximum value for heat conduction. Thus, supplying voltage and/or current to the graphene layer(s) 140 can cause the thermal conductivity (e.g., heat conduction) to decrease. As mentioned above, the ability to vary the thermal conductivity may enable a user to control the graphene layer 140 to help dissipate/bleed off the heat load during thermal runaway.

The system 200 may also include an enclosure bottom 250. The enclosure bottom 250 may be positioned below/beneath the battery cells 100, the graphene layer(s) 140, the cell support structure 210, and the thermal pad 220. As shown, the thermal pad 220 may be positioned between the graphene layer(s) 140 and the enclosure bottom 250. The enclosure bottom 250 may be or serve as a heat sink.

Figure 3:
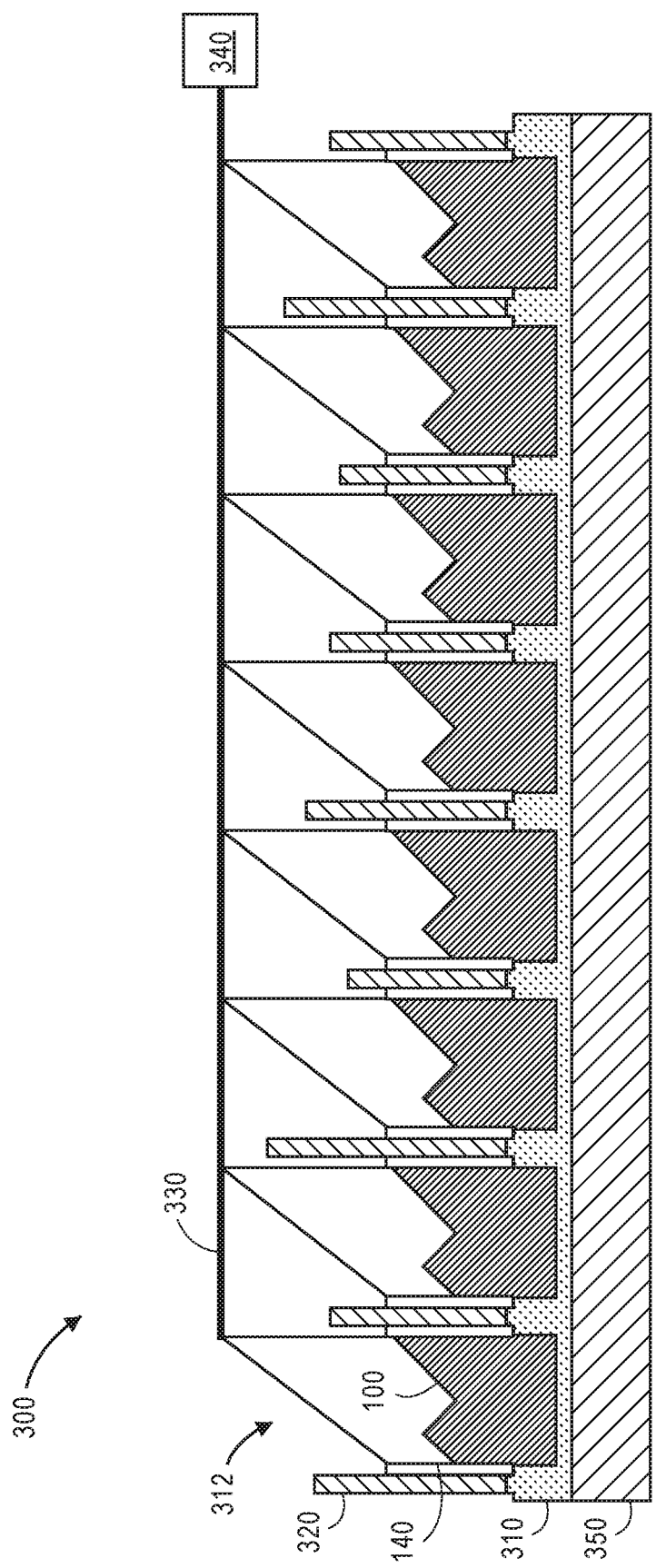
FIG. 3 illustrates a schematic view of a system for controlling an electrical conductivity/resistivity of the graphene layer, according to an implementation.

FIG. 3 illustrates a schematic view of a system 300 for controlling an electrical conductivity/resistivity of the graphene layer(s) 140, according to an implementation. The system 300 may be similar to the system 200. For example, the system 300 may also include a cell support structure 310 that at least partially defines a plurality of recesses or openings 312 in which the battery cell(s) 100 may be positioned. As shown, at least a portion of the side wall 110 and/or the second (e.g., lower) end wall 130 of each battery cell 100 may be in contact with the cell support structure 310. The cell support structure 310 may provide electrical isolation and/or a thermal interface for the battery cells 100.

The system 300 can include one or more bus ties 320 that may at least partially define the openings 312 in which the battery cell(s) 100 are positioned. As shown, at least a portion of the side wall 110 of each battery cell 100 may be aligned with the bus tie(s) 320. The bus tie(s) 320 may transmit power from the battery cell(s) 100 to a load.

The system 300 may also include the graphene layer 140. In this implementation, the graphene layer 140 can be or may include a doped graphene electrical interface, which can include one or more layers. As shown, the graphene layer 140 may be in contact with the side wall 110 of each battery cell 100, the cell support structure 310, and the bus tie(s) 320. However, as will be appreciated, in other implementations, the graphene layer 140 may also or instead be in contact with the first (e.g., upper) end wall 120, the second (e.g., lower) end wall 130, or both.

The system 300 can also include a wire 330 and an electrical control interface 340. The electrical control interface 340 may (e.g., electrically) modify one or more characteristics (e.g., electrical conductivity and/or resistivity) of the graphene layer(s) 140 by modifying the voltage and/or current supplied thereto via the wire 330. For example, the thermal conductivity and/or resistivity may be adjusted from a minimum value to a maximum value, which may be within the range(s) provided above. When not controlled by the electrical control interface 340 and the wire 330 (i.e., when no voltage or current is supplied), the graphene layer(s) 140 may default to isolating the circuit to its maximum potential as a safety mechanism. In another implementation, this may be changed to the alternative state so that it instead defaults to maximum electrical conduction. This may be selectively applied in different areas of the battery core by using different doping constructs in different locations. As mentioned above, the ability to vary the electrical conductivity may enable a user to control the graphene layer 140 to help the battery cell 100 and/or the graphene layer 140 to be more easily integrated into the core circuit.

The system 300 may also include an enclosure bottom 350. The enclosure bottom 350 may be positioned below/beneath the battery cells 100 and the cell support structure 310. As shown, the cell support structure 310 may be positioned between the battery cells 100 and the enclosure bottom 350.

Figure 4:
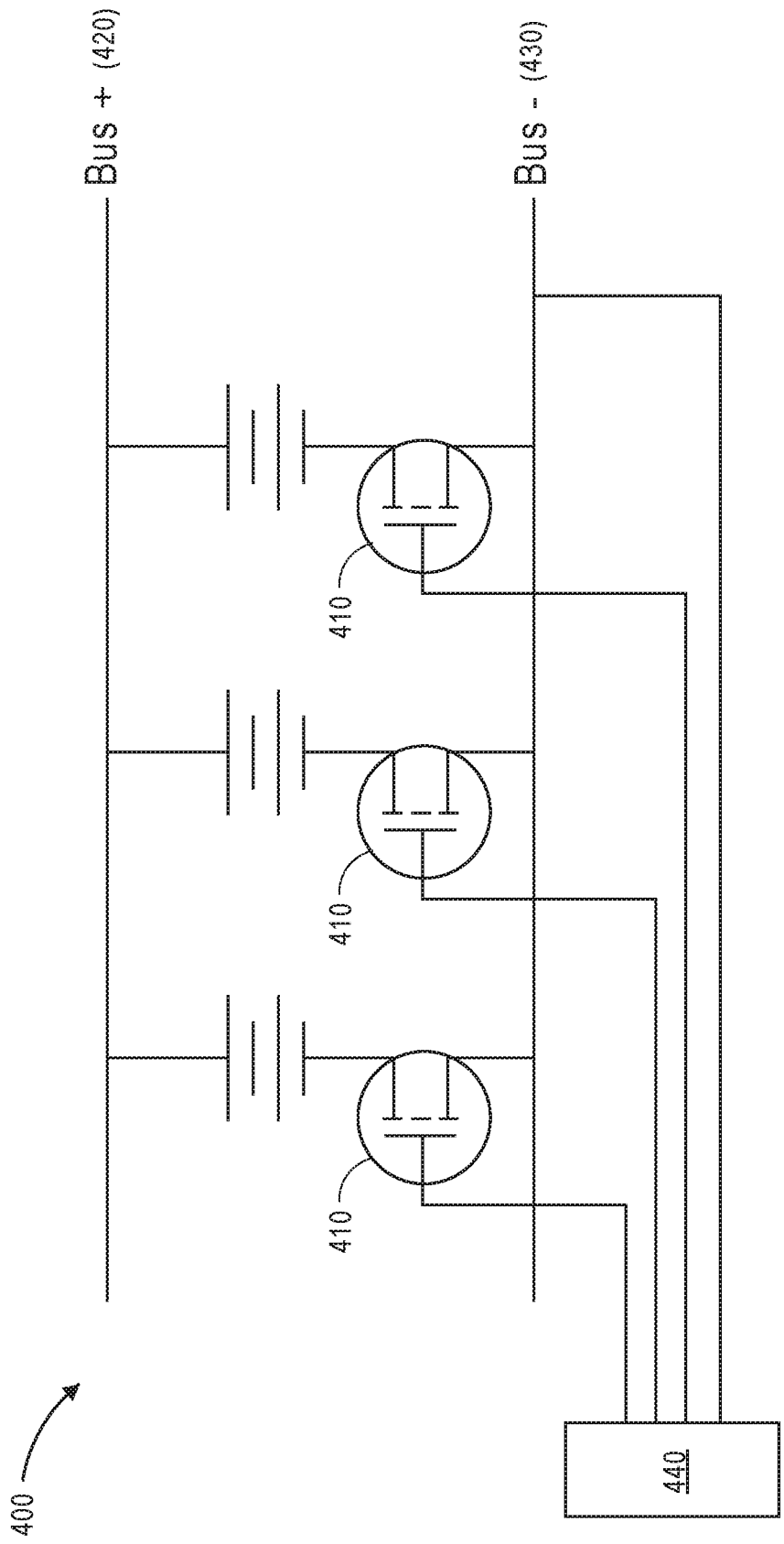
FIG. 4 illustrates a schematic view of a circuit for controlling the graphene layer, according to an implementation.

FIG. 4 illustrates a schematic view of a circuit 400 for controlling the graphene layer 140, according to an implementation. The circuit 400 can be or may include a doped graphene interface that is modelled as transistors 410. The transistors 410 may be or include field effect transistors (FETs). The circuit 400 may also include a first (e.g., positive) bus 420 and a second (e.g., negative) bus 430.

A controller 440 may be used to control the graphene layer by supplying and/or varying the electrical current and/or voltage supplied thereto. Control of the graphene layer can determine if the battery cell is in-circuit or out-of-circuit (or therebetween of an analog function is desired). The control of the graphene layer permits isolating a battery cell from the power buses 420, 430 if required for electrical performance or safety reasons. The control of thermal properties may be substantially the same as the control of electrical properties.

Figure 5:
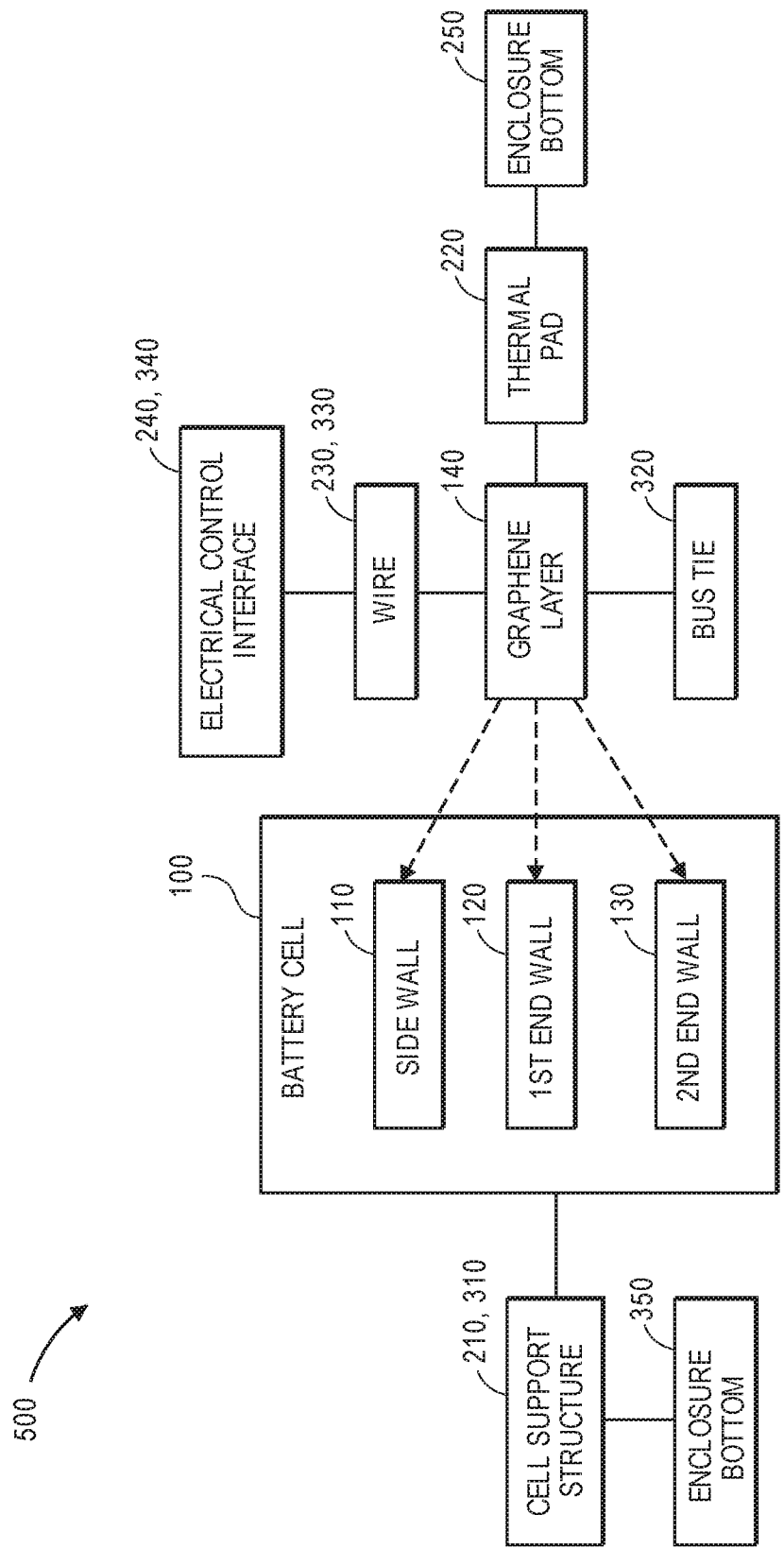
FIG. 5 illustrates a schematic view of a functional block diagram, according to an implementation.

FIG. 5 illustrates a schematic view of a functional block diagram 500, according to an implementation. The functional block diagram 500 includes components from FIG. 1, FIG. 2, and/or FIG. 3. For example, the functional block diagram 500 includes the battery cell 100 and the graphene layer 140 from FIG. 1. The functional block diagram 500 includes the battery cell 110, the graphene layer 140, the cell support structure 210, the thermal pad 220, the wire 230, the electrical control interface 240, and the enclosure bottom 250 from FIG. 2. The functional block diagram 500 includes the battery cell 100, the graphene layer 140, the cell support structure 310, the bus tie 320, the wire 330, the electrical control interface 340, and the enclosure bottom 350 from FIG. 3. The functional block diagram 500 illustrates one example of the connections and interactions of the components, a more detailed description of which is provided above.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A system, comprising:
    a battery cell;
    a graphene layer positioned on an outer surface of the battery cell; and
    an electrical control interface configured to supply power to the graphene layer to modify a thermal conductivity of the graphene layer, an electrical resistivity of the graphene layer, or both.

2. The system of claim 1, wherein the battery cell comprises a side wall, a first end wall, and a second end wall, and wherein the graphene layer is positioned on the outer surface of the side wall.

3. The system of claim 2, wherein the graphene layer being positioned on the outer surface of the side wall increases a strength of the side wall, thereby reducing a likelihood that the side wall will rupture during a thermal runaway event.

4. The system of claim 3, wherein the graphene layer is not positioned on the outer surface of the first end wall, thereby increasing a likelihood that the first end wall will rupture during the thermal runaway event.

5. The system of claim 1, wherein the graphene layer has a thickness from about 0.4 micrometers ($\mu$m) to about 1.5 $\mu$m.

6. The system of claim 1, wherein the graphene layer has a strength from about 10,000 pounds per square inch (lbs/in$^2$) to about 500,000 lbs/in$^2$.

7. The system of claim 1, wherein the thermal conductivity of the graphene layer is from about 1000 watts per meter-kelvin (W/m*K) to about 2500 W/m*K.

8. The system of claim 7, wherein the graphene layer is doped to reduce the thermal conductivity from a baseline value.

9. The system of claim 1, wherein the electrical resistivity of the graphene layer is from about 0.5E–6 ohms per meter ($\Omega$/m) to about 10E–6 $\Omega$/m.

10. The system of claim 9, wherein the graphene layer is doped to alter the electrical resistivity.

11. The system of claim 1, further comprising:
    a cell support defining an opening in which the battery cell is positioned;
    a thermal pad, wherein the graphene layer is positioned between an end wall of the battery cell and the thermal pad; and
    a heat sink, wherein the thermal pad is positioned between the graphene layer and the heat sink.

12. The system of claim 11, further comprising a wire configured to transmit the power from the electrical control interface to the graphene layer, wherein the wire is positioned at least partially in a conduit in the thermal pad.

13. The system of claim 1, further comprising:
    a cell support defining an opening in which the battery cell is positioned; and
    a bus tie, wherein the graphene layer is positioned between a side wall of the battery cell and the bus tie.

14. A system, comprising:
    a battery cell that is substantially cylindrical and comprises a side wall, a first end wall, and a second end wall;
    a graphene layer positioned on an outer surface of the side wall to increase a strength of the side wall, thereby reducing a likelihood that the side wall will rupture during a thermal runaway event, and wherein the graphene layer is not positioned on the outer surface of the first end wall, thereby increasing a likelihood that the first end wall will rupture during the thermal runaway event, wherein:
        the graphene layer has a thickness from about 0.4 micrometers ($\mu$m) to about 1.5 $\mu$m,
        the graphene layer has a thermal conductivity from about 1000 watts per meter-kelvin (W/m*K) to about 2500 W/m*K, and
        the graphene layer has an electrical resistivity from about 0.5E–6 ohms per meter ($\Omega$/m) to about 10E–6 $\Omega$/m; and
    an electrical control interface configured to supply power to the graphene layer to modify a thermal conductivity of the graphene layer, an electrical resistivity of the graphene layer, or both.

15. A method, comprising:
    applying a graphene layer on an outer surface of a side wall of a battery cell to increase a strength of the side wall, thereby reducing a likelihood that the side wall will rupture during a thermal runaway event, and wherein the graphene layer is not applied on an outer surface of a first end wall of the battery cell, thereby increasing a likelihood that the first end wall will rupture during the thermal runaway event; and supplying power to the graphene layer, using an electrical control interface, to modify a thermal conductivity of the graphene layer, an electrical resistivity of the graphene layer, or both.

16. The method of claim 15, wherein applying the graphene layer comprises wrapping a sheet of the graphene layer around the side wall, and wherein the graphene layer comprises a monocrystalline structure.

17. The method of claim 15, wherein applying the graphene layer comprises growing the graphene layer in place, and wherein the graphene layer comprises a polycrystalline structure.

18. The method of claim 17, wherein growing the graphene in place is performed by chemical vapor deposition or physical vapor deposition.

19. The method of claim 15, wherein applying the graphene layer comprises:
forming the graphene layer into a sleeve; and
sliding the sleeve at least partially around the battery cell.

20. The system of claim 14, further comprising:
a cell support defining an opening in which the battery cell is positioned;
a thermal pad, wherein the graphene layer is positioned between an end wall of the battery cell and the thermal pad; and
a heat sink, wherein the thermal pad is positioned between the graphene layer and the heat sink.

* * * * *